United States Patent
Kobayashi et al.

(10) Patent No.: US 7,980,588 B2
(45) Date of Patent: Jul. 19, 2011

(54) AUTOMOTIVE AIRBAG COVER AND METHOD OF MANUFACTURING AUTOMOTIVE AIRBAG COVER

(75) Inventors: Seiichi Kobayashi, Miyagi (JP); Yukihiro Murakami, Miyagi (JP)

(73) Assignee: Midori Technopark Co., Miyagi (JP)

( * ) Notice: Subject to any disclaimer, the term of this patent is extended or adjusted under 35 U.S.C. 154(b) by 0 days.

(21) Appl. No.: 12/532,554

(22) PCT Filed: Mar. 19, 2008

(86) PCT No.: PCT/JP2008/055040
§ 371 (c)(1),
(2), (4) Date: Sep. 22, 2009

(87) PCT Pub. No.: WO2008/117708
PCT Pub. Date: Oct. 2, 2008

(65) Prior Publication Data
US 2010/0102540 A1    Apr. 29, 2010

(30) Foreign Application Priority Data
Mar. 23, 2007   (JP) ................................. 2007-077454

(51) Int. Cl.
*B60R 21/16* (2006.01)
(52) U.S. Cl. ...................... 280/728.3; 264/241; 264/257
(58) Field of Classification Search ............... 280/728.3, 280/728.1, 732; 264/241, 257
See application file for complete search history.

(56) References Cited

U.S. PATENT DOCUMENTS

| | | | | |
|---|---|---|---|---|
| 4,120,516 A | * | 10/1978 | Takamatsu et al. | 280/728.3 |
| 5,611,564 A | | 3/1997 | Bauer | |
| 5,855,391 A | * | 1/1999 | Holland | 280/728.3 |
| 2001/0010423 A1 | | 8/2001 | Bauer et al. | |
| 2002/0176980 A1 | | 11/2002 | Marcovecchio | |
| 2003/0107203 A1 | | 6/2003 | Bauer et al. | |
| 2007/0207233 A1 | | 9/2007 | Bauer et al. | |

FOREIGN PATENT DOCUMENTS

| | | |
|---|---|---|
| CA | 2130374 | 2/1995 |
| EP | 0639481 | 2/1995 |
| EP | 1144223 | 3/2003 |
| JP | 7179161 | 7/1995 |
| JP | 9183373 | 7/1997 |
| JP | 2003516258 | 5/2003 |
| JP | 2003326628 | 11/2003 |
| WO | 0142052 | 6/2001 |

OTHER PUBLICATIONS

International Search Report, dated May 14, 2008, English translation included.

* cited by examiner

*Primary Examiner* — Eric Culbreth
(74) *Attorney, Agent, or Firm* — NDQ&M Watchstone LLP

(57) ABSTRACT

A skin material (5) including an impregnable fiber layer is overlapped and bonded onto a top surface of a base material (3) including a base material cleavage groove (13) having a predetermined depth from a rear surface of the base material (5) toward the top surface thereof. A skin cleavage groove (11) having a predetermined depth and corresponding to the base material cleavage groove (11) of the base material (3) is provided on a rear surface side of the skin material (5), the rear surface side being a bonding surface side to be overlapped and bonded onto the base material (3). Meanwhile, to facilitate cleavage, the skin cleavage groove (11) is provided inside a region of a hardened layer subjected to a hardening process by using a hardening agent.

3 Claims, 5 Drawing Sheets

| THICKNESS OF LEATHER 0.7mm | REMAINING THICKNESS OF SLIT PORTION | SLIT PORTION STRENGTH RATIO (%) | | | | | |
|---|---|---|---|---|---|---|---|
| | | WITHOUT HARDENED LAYER | | | WITH HARDENED LAYER | | |
| | | 80°C | ROOM TEMPER- ATURE | −40°C | 80°C | ROOM TEMPER- ATURE | −40°C |
| X DIRECTION | 0.2mm | 57 | 46 | 66 | 36 | 32 | 42 |
| | 0.3mm | 90 | 92 | 74 | 71 | 70 | 54 |
| Y DIRECTION | 0.2mm | 70 | 53 | 65 | 44 | 43 | 41 |
| | 0.3mm | 93 | 103 | 95 | 51 | 75 | 53 |

FIG. 6

| THICKNESS OF LEATHER 1.0mm | REMAINING THICKNESS OF SLIT PORTION | SLIT PORTION STRENGTH RATIO (%) | | | | | |
|---|---|---|---|---|---|---|---|
| | | WITHOUT HARDENED LAYER | | | WITH HARDENED LAYER | | |
| | | 80°C | ROOM TEMPER- ATURE | −40°C | 80°C | ROOM TEMPER- ATURE | −40°C |
| X DIRECTION | 0.2mm | 38 | 33 | 44 | 24 | 24 | 28 |
| | 0.3mm | 58 | 68 | 60 | 36 | 45 | 31 |
| | 0.5mm | 103 | 96 | 100 | 73 | 83 | 82 |
| Y DIRECTION | 0.2mm | 46 | 32 | 38 | 31 | 28 | 31 |
| | 0.3mm | 70 | 59 | 53 | 38 | 47 | 33 |
| | 0.5mm | 99 | 99 | 90 | 77 | 94 | 68 |

AUTOMOTIVE AIRBAG COVER AND METHOD OF MANUFACTURING AUTOMOTIVE AIRBAG COVER

TECHNICAL FIELD

The present invention relates to an automotive airbag cover suitable for one formed by overlapping and bonding a base material and a skin material together, and to a method of manufacturing the automotive airbag cover.

BACKGROUND ART

An automotive airbag cover is provided with cleavage grooves for allowing an air bag to pop out from inside to protect a passenger in case of emergency.

In general, the airbag cover to house the airbag is made of synthetic resin. However, in recent years, to impart a luxurious quality feel, there has been employed a measure to overlap and bond leather serving as a skin material onto a surface of a base material made of the synthetic resin.

Each of the base material and the leather is provided with a cleavage groove which is cleaved in case of emergency (see Patent Document 1, for example).

Patent Document 1: Japanese Patent Application Laid-Open No. Hei-9-183373

DISCLOSURE OF THE INVENTION

Problems to be Solved by the Invention

An essential condition for the airbag cover formed by the combination of the base material and the leather is that the base material and the leather must be accurately cleaved along the grooves in case of emergency.

As to the depth of the cleavage grooves, accurate groove formation is required that is appropriate for the materials of the airbag cover. However, because leather is soft and not elastic, it is particularly difficult to form the cleavage grooves accurately in the certain depths in leather.

Moreover, leather has another problem that, for example, it is hardly cleaved unless the grooves are formed deeply enough to reach a predetermined portion of a fiber layer. Leather is therefore not desirable in light of workability as it requires delicate management for forming the grooves.

At present, leather for imparting the luxurious quality feel has the problem that it is not easily cleaved when employed as the airbag cover.

Accordingly, it is an object of the present invention to provide an automotive airbag cover and a method of manufacturing the automotive airbag cover, the automotive airbag cover being securely cleaved along cleavage grooves in case of emergency without the grooves being delicately formed.

To attain the object, an automotive airbag cover of the present invention is characterized by including: a base material including a base material cleavage groove having a predetermined depth from a rear surface of the base material toward a top surface thereof; and a skin material overlapped and bonded onto the top surface of the base material in an integral manner. The automotive airbag cover is characterized in that: a hardened layer solidified by penetrating thereinto a hardening agent made of an adhesive used for the bonding to the base material is provided in an entire surface of the skin material on a rear surface side thereof that is a bonding surface side to be overlapped and bonded onto the base material; a skin cleavage groove is provided on the rear surface side of the skin material at a position corresponding to that of the base material cleavage groove of the base material; and the skin cleavage groove is formed shallower than the depth of the hardened layer so as to produce, at a time of a cleaving action, stress concentration acting in an opening direction, at a groove bottom of the skin cleavage groove by way of the hardened layer, the hardened layer being subjected to a hardening process by the adhesive for bonding the base material to the skin material.

The hardening agent is preferably an adhesive which hardens with passage of time and whose adhesive function is recovered when heated.

Meanwhile, a method of manufacturing an automotive airbag cover according to the present invention is characterized by including: a cleavage groove forming step of forming a skin cleavage groove having a predetermined depth in a rear surface of a skin material; a coating and penetrating step of applying a hardening agent on the rear surface of the skin material and penetrating a fiber layer with the applied hardening agent; a drying step of drying the hardening agent for a certain period of time after the coating and penetrating step; a thermo-forming step of thermo-forming the skin material having the hardening agent dried in the drying step, by applying heat to the skin material; and bonding step of overlapping and bonding the rear surface of the skin material onto a top surface of a base material with the skin cleavage groove of the thermo-formed skin material aligned with a base material cleavage groove of the base material, the base material being formed in a separate process.

Effects of the Invention

According to the present invention, the skin material overlapped and bonded onto the top surface of the base material is cleaved along the skin cleavage groove together with the base material cleavage groove of the base material when an airbag is activated in case of emergency.

At the time of this cleaving action, strong stress concentration acting in an opening direction is produced at the groove bottom of the skin cleavage groove by way of the hardened layer. Accordingly, it is possible to achieve cleavage reliably even if there is variation in the depth of the cleavage groove. This facilitates management of groove formation of the cleavage groove and thus is very favorable in light of workability as well.

BRIEF DESCRIPTION OF THE DRAWINGS

FIG. 6 is a table describing test results when the thickness of the leather is equal to 1.0 mm.

BEST MODE FOR CARRYING OUT THE INVENTION

Figure 1:
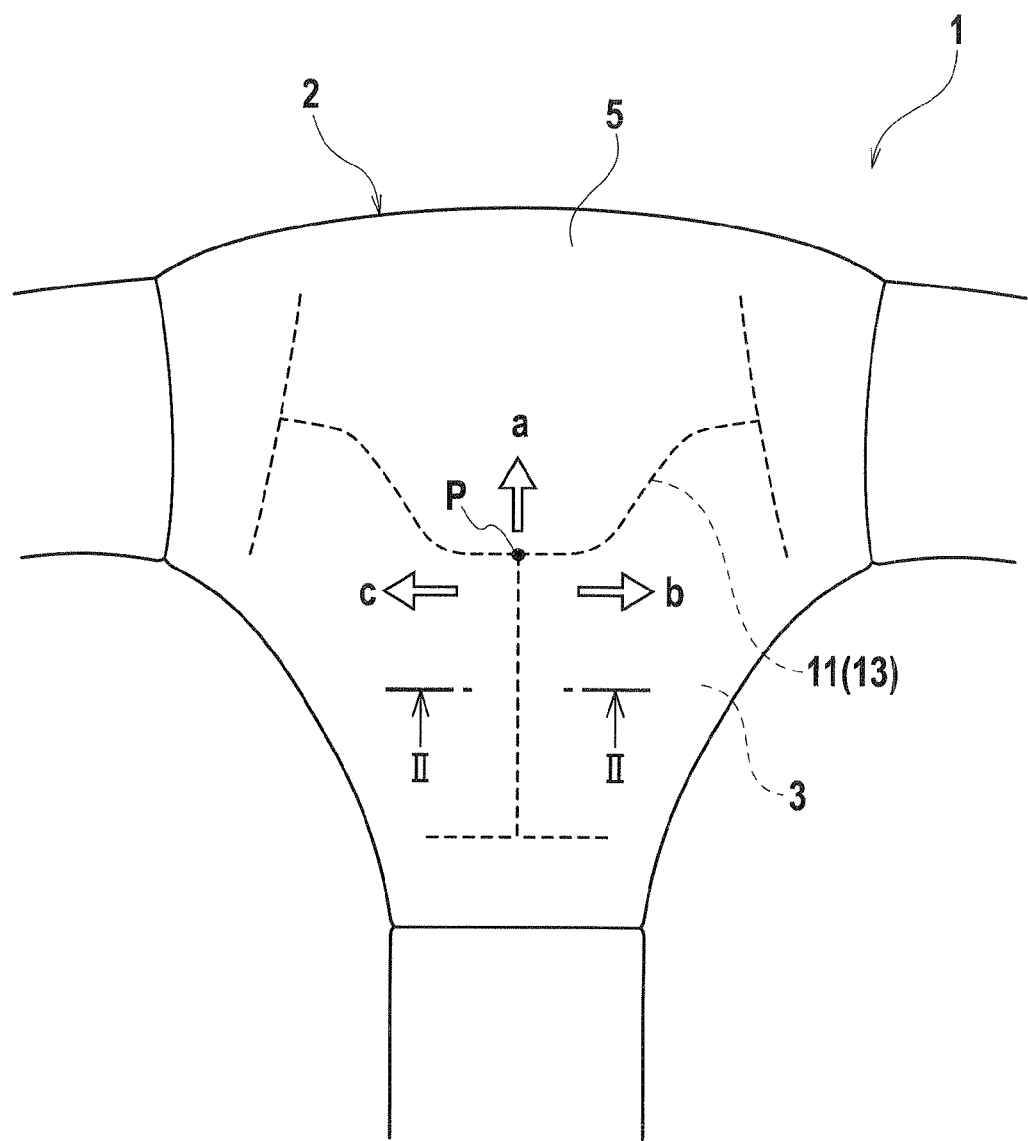
FIG. 1 is a view showing a schematic configuration of an automotive airbag cover.
Figure 2:
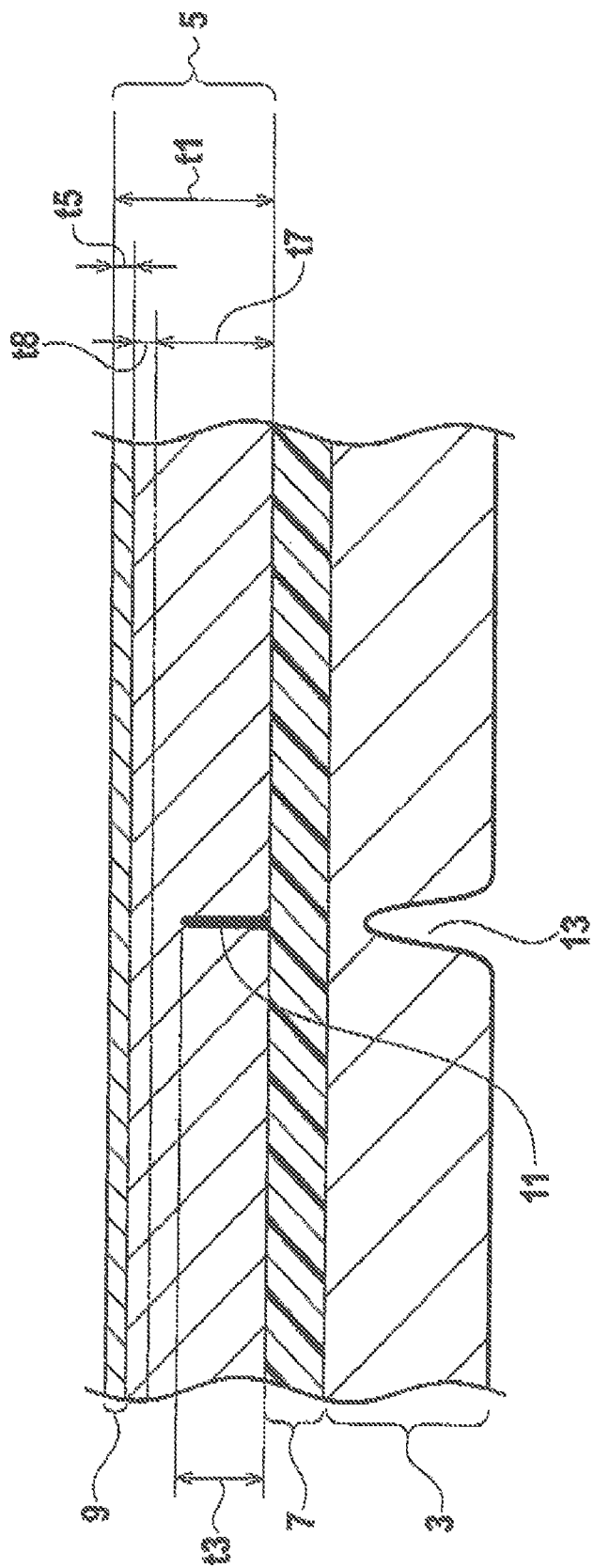
FIG. 2 is a view showing a II-II cross section in FIG. 1.

FIG. 1 is a view showing a schematic configuration of an automotive airbag cover 1. FIG. 2 is a view showing a II-II cross section in FIG. 1.

A horn pad 2 will be described as an example of the automotive airbag cover 1. The horn pad 2 is provided at a central portion of a steering wheel of an automobile and an airbag unit configured to pop out in case of emergency is provided inside the horn pad 2 shown in FIG. 1 (a back side of a sheet surface of FIG. 1).

The horn pad 2 has a structure including a base material 3 made of synthetic resin and a skin material 5 which is overlapped and bonded onto a top surface of this base material 3.

The base material 3 is formed along the shape of the horn pad 2, and a base material cleavage groove 13 having a predetermined depth is formed in a rear surface (a lower side in FIG. 2).

The base material cleavage groove 13 is formed as the cleavage groove extending upward a and toward both sides b from a center P of the base material cleavage groove 13, as shown in FIG. 1.

The skin material 5 may be made of natural leather such as cowhide, or may be made of an artificial leather as long as it includes an impregnable (penetratable) layer, such as a fiber layer.

Here, the skin material will be described below as natural leather 5.

The leather 5 has a grain side constituting a skin surface and an inner flesh side constituting the flesh side, and the fiber layer is dense on the grain side and coarse toward the flesh side. A coating film 9 having a fine thickness t5 is applied on the grain side as shown in FIG. 2 to impart texture of the leather 5.

A skin cleavage groove 11 in an identical shape to the above-described base material cleavage groove 13 is provided in a rear surface of the leather 5 constituting the flesh side.

A hardening agent 7 is caused to penetrate into and solidified in an entire surface of the leather 5 on the flesh side (except the coating film 9) provided with the skin cleavage groove 11. A portion penetrated with and solidified by the hardening agent 7 is a portion ranging from the flesh side of the leather 5 to a depth t7. The depth t7 is preferably formed deeper than a depth t3 of the skin cleavage groove 11. In FIG. 2, no penetration with the hardening agent 7 takes place in a portion indicated by a thickness t8. Here, the value of the thickness t8 may be substantially equal to "0."

The hardening agent 7 is preferably made of a material that penetrates the fiber layer after being applied thereto and hardens with passage of time.

Any materials are applicable as long as the above-described condition is satisfied. Here, an adhesive having both of a hardening function and a function to bond the base material 3 to the leather 5 is employed in this embodiment.

The adhesive is a urethane-based adhesive which hardens with passage of time and whose adhesive function is recovered when heated.

Accordingly, it is easy to handle the leather 5 at the time of hardening the adhesive.

Note that an acryl-based hard adhesive or an epoxy-based hard adhesive may be used instead of the urethane-based one. Needless to say, a pressure-sensitive adhesive, a solvent or the like may be used instead of the aforesaid adhesive.

Next, a method of manufacturing the horn pad 2 will be described.

Figure 3:
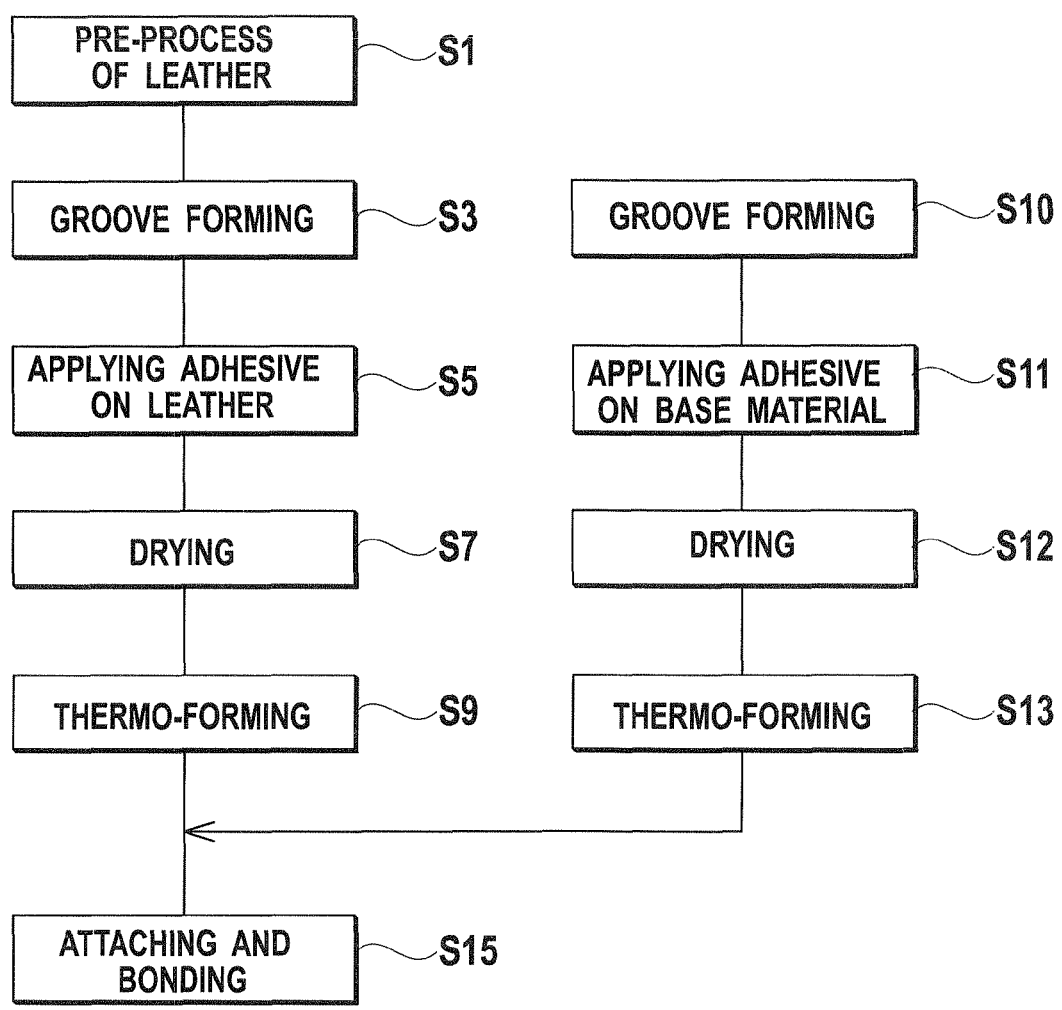
FIG. 3 is a flowchart showing outline steps of a method of manufacturing a horn pad.

FIG. 3 is a flowchart showing outline steps of the method of manufacturing the horn pad 2.

First, the leather 5 is subjected to a pre-process (S1) such as dehairing or tanning and then the skin cleavage groove 11 is formed therein (S3). At this time, the leather 5 is assumed to be provided with the coating film 9 in advance in the pre-process. After forming the skin cleavage groove 11, the leather 5 is cut out in a predetermined shape from a leather material. Alternatively, the skin cleavage groove 11 may be formed after cutting out the leather 5 in the predetermined shape from the leather material.

The adhesive serving as the hardening agent 7 is applied on the leather 5 provided with the skin cleavage groove 11 (S5) and the adhesive after its application and penetration is dried (S7). Next, a thermo-forming is performed (S9) when it becomes easy to handle the leather 5 as the drying of the adhesive advances.

Meanwhile, in a separate process, the base material 3 is subjected to formation of the base material cleavage groove 13, separate adhesive is applied onto the top surface of the base material 3, it is dried, and the base material is thermo-formed (S10, S11, S12, and S13), then the thermo-formed leather 5 is overlapped and bonded with the skin cleavage groove 11 aligned with the base material cleavage groove 13 of the base material 3 (S15). At this time, the adhesive is in the state where its adhesive function has been recovered due to the heating and therefore firmly bonds the base material 3 to the leather 5.

After the bonding of the leather 5 to the base material 3, a solvent in the adhesive provided on the leather 5 and the base material 3 is substantially evaporated by naturally drying the adhesive for 2 to 3 days, whereby a cross-linking reaction of the adhesive is nearly completed. Accordingly, after the natural drying, the leather 5 will not be softened again even if a temperature rises in a range from 50° C. to 100° C.

Incidentally, in the above-described procedures, the skin cleavage groove 11 may be formed in the leather 5 after the application of the adhesive on the leather 5 and the drying thereof.

The leather 5 of the horn pad 2 configured as described above is cleaved along the skin cleavage groove 11 together with the base material cleavage groove 13 of the base material 3 when the airbag is activated in case of emergency. Even if the adhesive having penetrated the leather 5 enters the groove 11, wall surfaces of the groove 11 are not tightly bonded to each other. Therefore, it is not necessary to separately provide a masking member to prevent the adhesive from entering the groove 11.

Moreover, at the time of the cleaving action, strong stress concentration acting in an opening direction is produced at a groove bottom of the skin cleavage groove 11 by the hardened layer. Accordingly, it is possible to achieve cleavage reliably even if there is variation in the depth of the cleavage groove 11. Relevant test results are shown in FIG. 5 and FIG. 6.

Figures 4, 5:
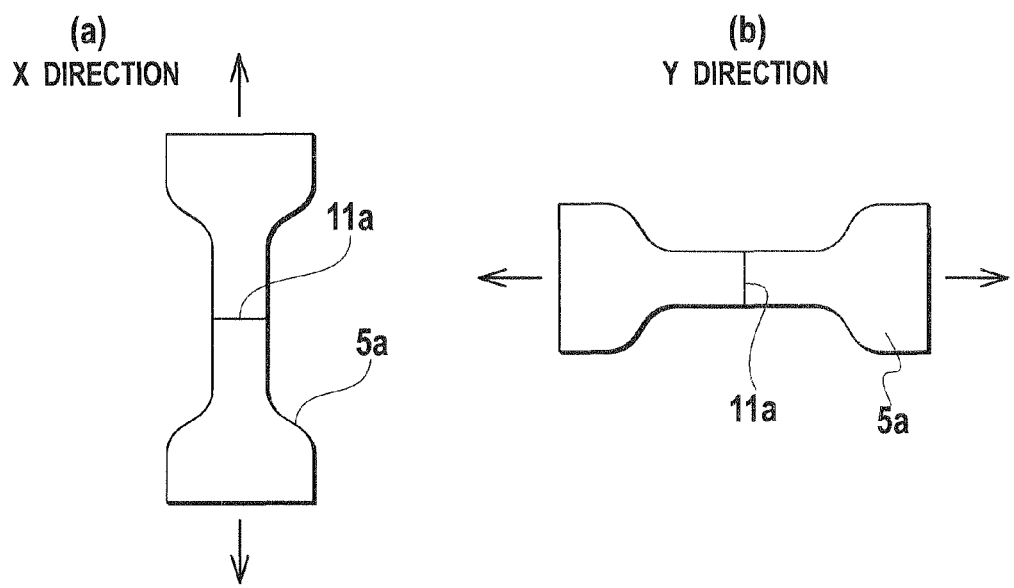
FIG. 4 is an explanatory view of test pieces cut out of a leather material along an X direction and a Y direction.
FIG. 5 is a table describing test results when the thickness of the leather is equal to 0.7 mm.

FIG. 5 shows a case where the thickness of the leather 5 is 0.7 mm. An X direction and a Y direction are provided because the fiber layer has a certain orientation. As shown in FIGS. 4(a) and 4(b), test pieces 5a provided with skin cleavage grooves 11a are cut out of the leather material respectively in the X direction and the Y direction representing the directions orthogonal to the orientations of the respective fiber layers.

A slit portion strength ratio (%) is expressed by Slit portion strength ratio A=Slit portion strength/General portion strength×100. Cleavage becomes easier when the numerical value becomes smaller.

Note that FIG. 6 shows a case of using the leather with a thickness of 1.0 mm which is thicker than that in FIG. 5. Conditions are the same as FIG. 5 using the 0.7-mm leather 5.

According to the test results in FIG. 5 and FIG. 6, in a case of using the leather 5 having a thickness of 0.7 mm, being cut out in the X direction and having a remaining thickness of 0.2 mm (groove depth of 0.5 mm), one without the hardened layer shows values of (80° C.) 57%, (room temperature) 33%, and (−40° C.) 44% while one with the hardened layer shows values of (80° C.) 24%, (room temperature) 24%, and (−40° C.) 28%.

Meanwhile, in a case where the remaining plate thickness is 0.3 mm (groove depth is 0.4 mm), one without the hardened layer shows values of (80° C.) 90%, (room temperature) 92%, and (−40° C.) 74% while one with the hardened layer shows values of (80° C.) 71%, (room temperature) 70%, and (−40° C.) 54%.

The same applies to the Y direction, which means that the leather with the hardened layer is cleaved more easily than the one without the hardened layer. Hence the experiments prove that reliable cleavage can be expected even if there is variation in the depth of the cleaved groove.

In the above-described embodiment, the horn pad 2 has been described as an example of the automotive airbag cover 1. It is also possible to cite a region (a region where an airbag unit is housed inside) of an instrument panel on a passenger side as another example of the airbag cover.

The invention claimed is:

1. An automotive airbag cover, characterized by comprising:
    a base material including a base material cleavage groove having a predetermined depth from a rear surface of the base material toward a top surface thereof; and
    a skin material overlapped and bonded onto the top surface of the base material in an integral manner;
    characterized in that a hardened layer solidified by penetrating thereinto a hardening agent made of an adhesive used for the bonding to the base material is provided in an entire surface of the skin material on a rear surface side thereof that is a bonding surface side to be overlapped and bonded onto the base material,
    a skin cleavage groove is provided on the rear surface side of the skin material at a position corresponding to that of the base material cleavage groove of the base material, and
    the skin cleavage groove is formed shallower than the depth of the hardened layer so as to produce, at a time of a cleaving action, stress concentration acting in an opening direction, at a groove bottom of the skin cleavage groove by way of the hardened layer, the hardened layer being subjected to a hardening process by the adhesive for bonding the base material to the skin material.

2. The automotive airbag cover according to claim 1, characterized in that
    the hardening agent is an adhesive which hardens with passage of time and whose adhesive function is recovered when heated.

3. A method of manufacturing an automotive airbag cover, characterized by comprising the steps of:
    a cleavage groove forming step of forming a skin cleavage groove having a predetermined depth in a rear surface of a skin material;
    a coating and penetrating step of applying a hardening agent on the rear surface of the skin material and penetrating a fiber layer with the applied hardening agent;
    a drying step of drying the hardening agent for a certain period of time after the coating and penetrating step;
    a thermo-forming step of thermo-forming the skin material having the hardening agent dried in the drying step, by applying heat to the skin material; and
    bonding step of overlapping and bonding the rear surface of the skin material onto a top surface of a base material with the skin cleavage groove of the thermo-formed skin material aligned with a base material cleavage groove of the base material, the base material being formed in a separate process.

* * * * *